United States Patent

Armstrong et al.

[11] Patent Number: 5,785,114
[45] Date of Patent: Jul. 28, 1998

[54] INTEGRAL HYDROGEN COOLER ASSEMBLY FOR ELECTRIC GENERATORS

[75] Inventors: Patrick W. Armstrong, League City, Tex.; Homer G. Hargrove, Maitland, Fla.

[73] Assignee: Westinghouse Electric Corporation, Pittsburgh, Pa.

[21] Appl. No.: 605,938

[22] Filed: Feb. 23, 1996

[51] Int. Cl.⁶ .................. H02K 9/00; H02K 9/08; H02K 1/32
[52] U.S. Cl. .................. 165/47; 165/74; 165/76; 165/83; 165/158; 310/55; 310/57; 310/64
[58] Field of Search .................. 165/47, 74, 76, 165/83, 158; 310/55, 57, 64, 54

[56] References Cited

U.S. PATENT DOCUMENTS

| | | | |
|---|---|---|---|
| 1,756,458 | 4/1930 | Gordon | 165/158 |
| 2,707,243 | 4/1955 | Baudry et al. | 310/57 |
| 2,780,739 | 2/1957 | Baudry et al. | 310/55 |
| 3,619,674 | 11/1971 | Daimo et al. | 310/54 |
| 3,656,543 | 4/1972 | Wolowodiuk et al. | 165/158 |
| 3,667,541 | 6/1972 | Howe | 165/74 |
| 3,681,628 | 8/1972 | Krastchew | 310/54 |
| 4,434,058 | 2/1984 | Emshoff et al. | 210/662 |
| 4,634,044 | 1/1987 | Hargrove et al. | |
| 4,817,857 | 4/1989 | Hargrove et al. | |
| 5,074,672 | 12/1991 | Emery et al. | |
| 5,097,669 | 3/1992 | Hargrove et al. | 310/55 |
| 5,425,415 | 6/1995 | Master et al. | 165/154 |

FOREIGN PATENT DOCUMENTS

| | | | |
|---|---|---|---|
| 0501486 | 4/1954 | Canada | 165/158 |
| 0282493 | 11/1988 | Japan | 165/158 |
| 0637020 | 2/1950 | United Kingdom | 310/55 |

*Primary Examiner*—John K. Ford

[57] ABSTRACT

Hydrogen coolers are provided with a cooler frame; cooling tubes positioned within the cooler frame; a tube bundle; an inlet chamber adjacent to an inlet end of the tube bundle; a reverse chamber adjacent to the reverse end of the tube bundle; and a support bracket adapted to be mounted on a frame of an electric generator. The support bracket defines an opening sized to receive inlet and outlet connections to the inlet chamber. The support bracket includes a shoulder for supporting the inlet chamber. This invention also encompasses the method of assembling these coolers in an electric generator.

11 Claims, 4 Drawing Sheets

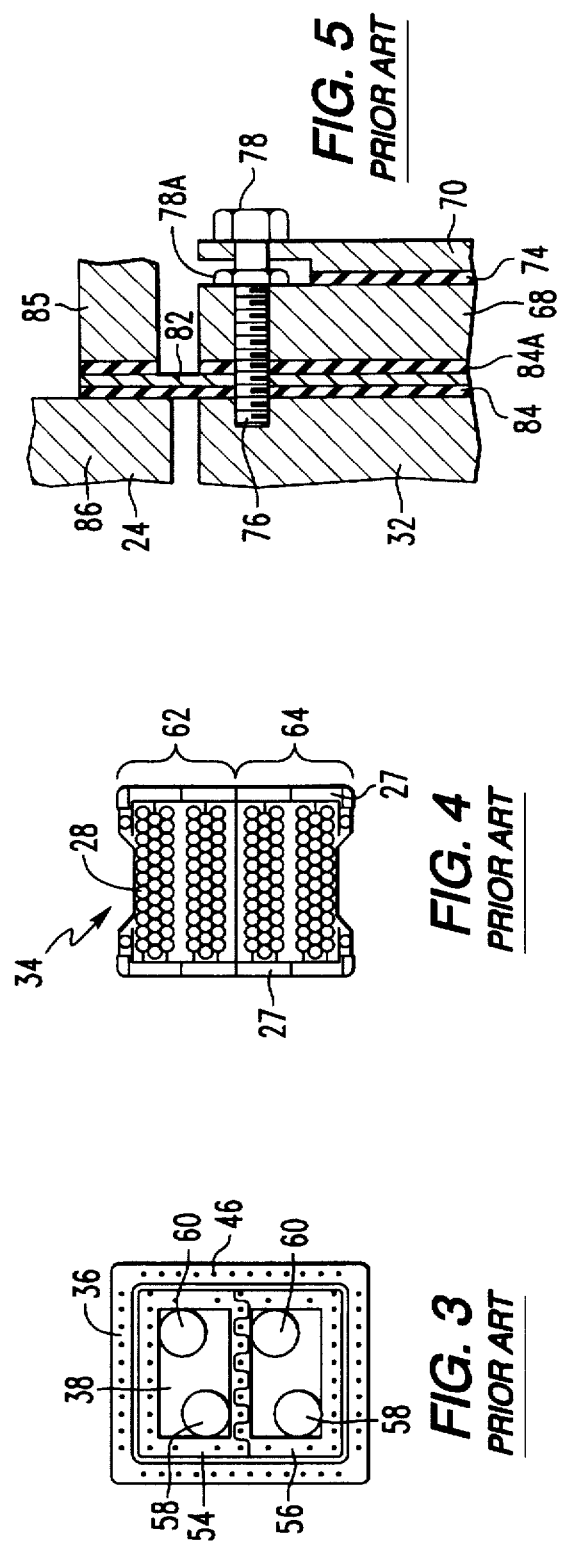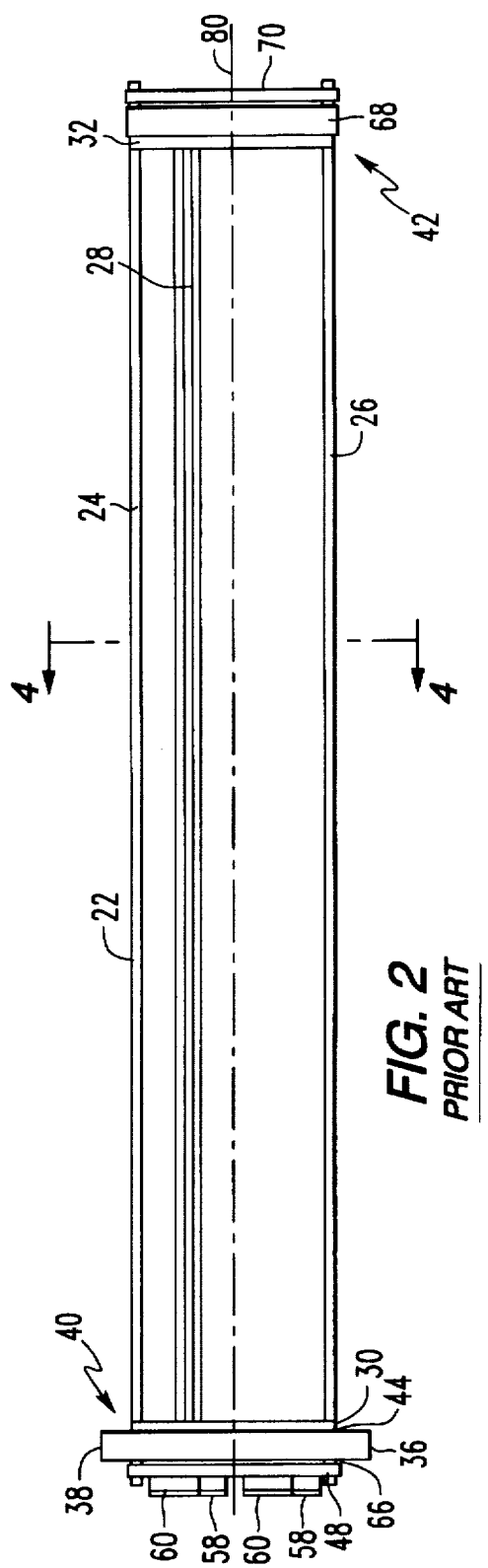

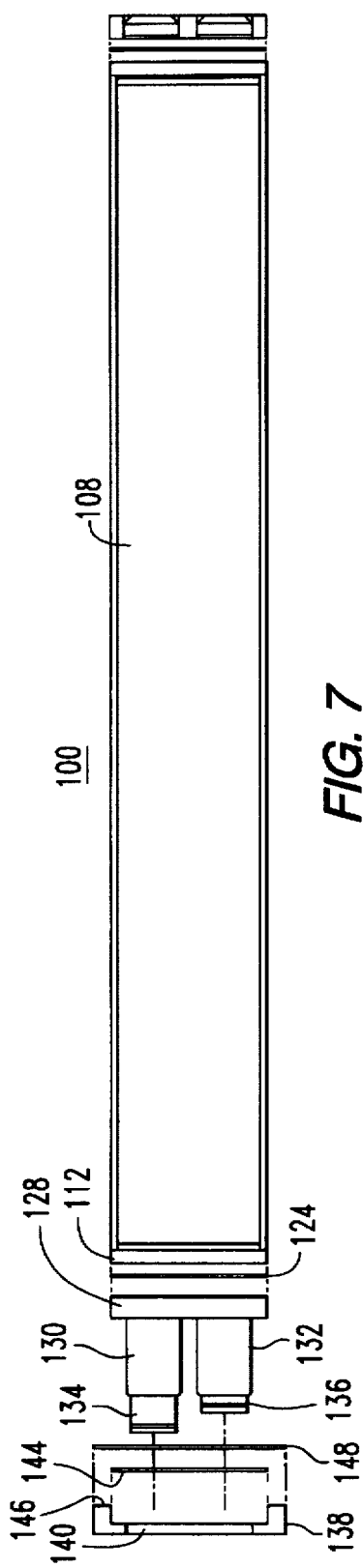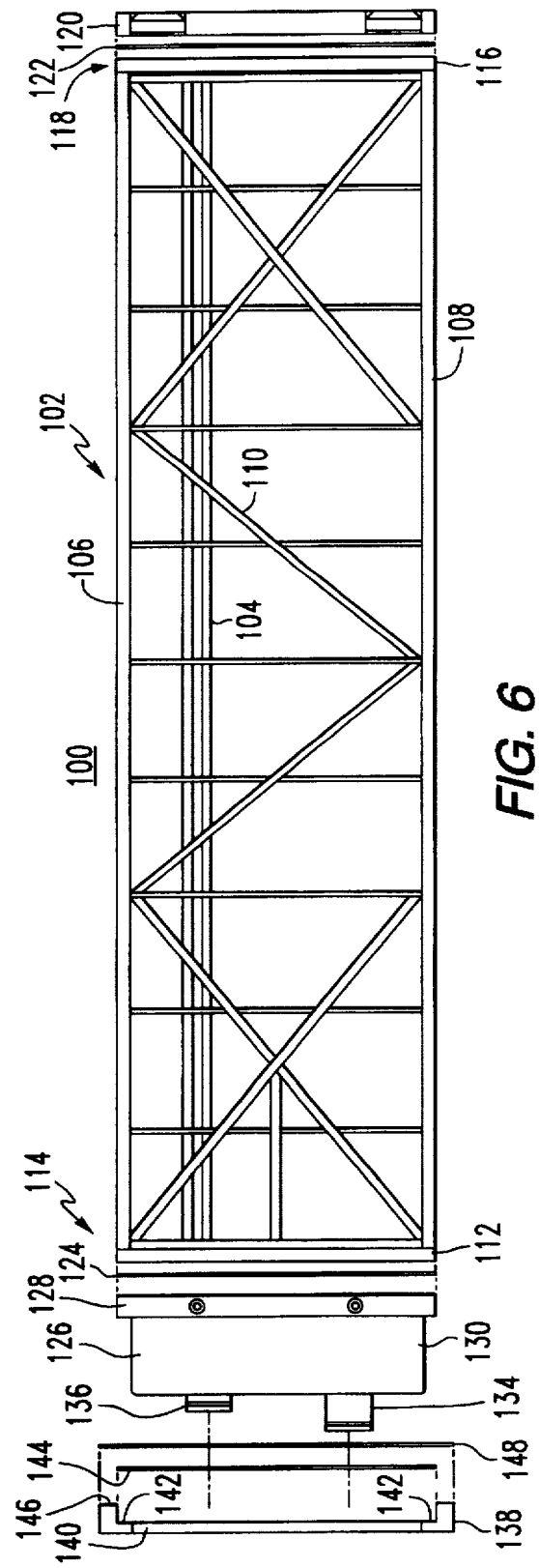

INTEGRAL HYDROGEN COOLER ASSEMBLY FOR ELECTRIC GENERATORS

BACKGROUND OF THE INVENTION

This invention relates to cooling assemblies for electric generators, and in particular, to hydrogen coolers and methods of securing such coolers in electric generators.

Because of heat generated from electrical and mechanical losses, internal components of commercial electric generators must be cooled to ensure that winding temperatures do not exceed prescribed insulation temperature ratings and that proper mechanical clearances are maintained. Early generator designs used air forced around and through the generator internal structures as the cooling medium. Beginning in the late 1930's, as generators became larger, designers switched from air cooled to hydrogen cooled generators. Hydrogen is an excellent cooling medium, possessing excellent thermodynamic and transport properties: low specific heat capacity, low viscosity, and low density over the usual temperature range of interest (30° F. to 180° F.). Hydrogen is 10 to 20 times more efficient than air as a cooling medium in this application. A major negative aspect of hydrogen cooling is that the gas forms explosive mixtures with air over a wide range of hydrogen concentrations. Therefore, it is necessary to provide appropriate seals at the boundaries of the generator enclosure to control hydrogen leakage. Equally important is maintaining the purity of the hydrogen contained in the generator since the introduction of contaminant gases, primarily air, greatly reduces the heat transfer properties of the cooling gas.

The hydrogen gas is continuously recirculated around and through the generator internal components in prescribed flow paths and loops. Fan type blowers, typically integrally mounted on the generator rotor, provide the means for maintaining the gas flow through the recirculation paths. Hydrogen coolers are mounted within the generator enclosure, and typically located near the blower outlets. The function of the these coolers is to remove heat absorbed by the gas during its passage through the generator. In most applications, there are usually two, sometimes four, coolers in a generator. The gas paths are so arranged that each cooler shares equally in the heat removal duty, that is, the gas flow is the same through each cooler. For the gas flow side, the hydrogen coolers are in series between the blower outlet and the generator windings and internal structures. Hot gas coming from the windings enters the suction side of the blower and is discharged from the blower through the coolers where the gas is cooled and then directed back into the windings and the other internal structures.

In early hydrogen cooled generator designs, the coolers were installed in the generator in a position parallel to the longitudinal axis of the generator. Later designs had the coolers positioned perpendicular to the rotor axis. For reasons related to minimizing gas flow pressure drop through the coolers and obtaining efficient heat transfer, the coolers span nearly the full generator frame diameter for vertical units, and nearly the full length of the generator for horizontal units.

Vertical coolers are normally located at the generator end nearest the prime mover, normally a steam or gas turbine. Horizontal coolers are located at approximately the 10 o'clock and 2 o'clock positions when viewing the generator from either end.

Hydrogen coolers typically include a metal frame which supports numerous finned tubes. These tubes are attached to tube sheets at both ends. Water chambers and covers bolt to the tube sheets to form a water tight assembly. The chambers and covers provide a sealed passage for water flow into the cooler, through the tubes and then back out of the cooler.

The coolers are installed inside the generator, exposing the finned tubes to the hydrogen gas flow. After removing thermal energy from the electrical windings, the hydrogen flows over the fins, where thermal energy is conducted through the fins, into the tubes and then into the water. The hydrogen exits the cooler and is directed back to the windings to begin another cycle.

From the outset, generator designers were concerned with providing a hermetically sealed cooler because of the explosive nature of hydrogen gas. At the same time, the designers wished to accommodate cooler maintenance and repair activities including a relatively straight forward procedure to remove the coolers if necessary. Moreover, since the cooling water supply would most likely be raw, untreated water from rivers, lakes and bogs, it was anticipated the coolers would require at least frequent periodic and sometimes unscheduled emergency maintenance repairs. Thus, to avoid the time consuming removal of all hydrogen from the generator every time a cooler required maintenance, the designers decided to seal the coolers into the generator by using a static, bolted and gasketed seal on one end of the cooler, and a floating, but sealed opposite end. The static end is known as the inlet end, because the cooling water supply lines to and from the cooler are connected on that end. The opposite end is commonly referred to as the reverse end. The inlet end of the cooler is gasketed and bolted to the generator frame (at the bottom of the generator on vertical coolers and at the turbine end on horizontal coolers) and the reverse end contains a flat metal or elastomeric diaphragm which connects the reverse end water boxes to the generator frame. The diaphragm is sandwiched between the reverse end water box and the reverse end tubesheet, spanning the surrounding annulus between the cooler reverse end and the generator frame. Appropriate bolting and gaskets provide means for sealing the diaphragm and reverse end water box together to the reverse end tubesheet. Gasketing and bolting secure the diaphragm to the generator frame. With the gasketed, static seal on the inlet end and the gasketed diaphragm floating reverse end, the coolers are sealed against hydrogen gas leakage. The diaphragm has limited, but sufficient flexibility to accommodate the increase in length of the cooler due to thermal expansion as the cooler goes from room temperature to operating temperature.

As generator power ratings increased over time, it became necessary to increase the hydrogen gas pressure to provide sufficient gas mass inside the generator to meet the increased cooling demands. The conflicting demands of flexibility for thermal expansion and required rigidity to withstand higher pressures, requires that at the rated operating conditions, the diaphragm operate under balanced pressure conditions. This demand was met by providing a spacer and top cover bolted to the generator frame that formed a gas-tight "hat" over the reverse end of the cooler. Valving and passages provided in the spacer permitted communication with the generator internal structures and allowed the pressure on either side of the diaphragm to be approximately equal. Prior to servicing the coolers, the generator gas pressure is reduced to close to atmospheric, the appropriate valve in the spacer is closed, isolating the "hat" from the generator body. The "hat" is then vented through another valve, relieving the gas pressure and allowing access to the cooler. Note that this scheme still allows cooler access without completely purging the generator, assuming of course, that the diaphragm and its associated gasketed closures remain gas-tight.

Although this sealing scheme has remained in practice for better than 50 years, there are several conditions and operations required or imposed by this design that have had increasingly negative aspects in manufacturing, installation and servicing of these coolers with the passage of time. Because of the limited flexibility of the diaphragm, it is an inherent requirement that the tube bundle assembly closely match the length of the generator opening, typically within plus or minus 0.06 inch. Moreover, bolting patterns on both the inlet and reverse end water box assemblies must closely align with, and be concentric with the bolting patterns on the respective generator frame openings or the cooler cannot be assembled to the generator. This places extremely narrow margins on tolerances allowed for fabricating the open box frame that supports and encloses the finned tube array, and dictates that much care goes into achieving and maintaining the straightness, flatness, and perpendicularity of the edges and surfaces of the rectangular tube bundle assembly throughout the manufacturing cycle of the frame and tube support construction, assembly of tubesheets to the frame, finned tube installation, and rolling of the tube ends into the tubesheets. Any twist, bow or non-parallel alignment between inlet and reverse end tubesheets can make subsequent assembly into the generator very difficult and sometimes impossible. Thus the "sealed" generator hydrogen cooler design requires excessive attention to achieve close manufacturing tolerances and geometric attributes, thereby driving the manufacturing cost up.

Upon completion of manufacture, coolers are hydrotested for proof of leak tightness of the tubes, tubesheet roll joints, and the inlet and reverse end water boxes. This leak-tested configuration however, is not the same as installed in the generator since the coolers must be first disassembled to permit integration with the generator. It has been a common experience that both new and rebuilt coolers, although shop tested as leak-tight, would exhibit either water or gas leakage upon post installation testing. The root causes for these leakages almost universally could be traced to improper cooler geometry causing misalignment of the cooler bolting pattern to the that of the generator frame. Often times, the gasket "stack" required by the cooler design (at least two on the inlet end and four on the reverse end) resulted in uneven gasket loads, gasket relaxation during service and sometimes misalignment of a gasket within its mating sealing surface, or even squeezing out of a gasket from between its mating surfaces. These types of situations became much more pronounced and common as asbestos fiber gaskets were replaced by non-asbestos materials for environmental and safety reasons. The non-asbestos gasketing required higher bolting loads to achieve initial water and gas leak-tight enclosures. Further, the non-asbestos gaskets proved more porous and often exhibited creep or relaxation, so that many times the gasketed seals on the diaphragm became loose or leaky, which defeated the purpose of the diaphragm seal. As a consequence, the unreliability of the diaphragm seals resulted in utilities not trying to service the coolers with any hydrogen present in the generator.

The primary maintenance requirements of coolers involve cleaning the inside (water side) of the tubes and plugging leaky tubes. The inside of the tubes becomes fouled with sediment from the raw water requiring cleaning to restore the efficiency of the cooler. Normally the cleaning can be done by exposing the tube ends and mechanically cleaning the inside diameter of the tubes. By a variety of methods, leaking tubes and tube-to-tubesheet rolled joints can be located and appropriate measures taken to plug leaking tubes.

Previous hydrogen cooler designs provided the means to perform these procedures without removing the coolers from the generators, or complete purging the hydrogen from the generator. By using independent chambers and chamber covers, maintenance could be performed quickly and easily without removing the coolers from the generators. A metal diaphragm provided a hydrogen barrier, enhancing the ease of maintenance by allowing the cleaning to be performed without purging hydrogen from the generator.

Early model generators were designed with the coolers positioned horizontally, parallel to the rotor center line. Both the inlet and reverse chamber assemblies protruded out of the ends of the generator frame. This allowed access by an overhead crane for installation and removal of the chambers and covers. For cleaning operations, the covers had to be unbolted and lifted out of the way, leaving the chambers and cooler in place. The metal diaphragm on the reverse end and the inlet chamber retained the hydrogen in the generator. This required minimal down time. The coolers could be cleaned and the covers re-installed quickly and easily.

Design changes as generators increased in rating required that the hydrogen coolers be positioned vertically on either side of the centerline of the generator. This change in orientation defeated many of the features of the horizontal orientation. The ability to easily maintain the coolers was lost, and cooler assembly and disassembly became more difficult. For example, the inlet end is positioned near the bottom of the generator in an area that is typically confined with no provisions for lifting the chamber and cover into position.

There is a need for a hydrogen cooler assembly that can be more easily maintained and mounted in an electric generator.

SUMMARY OF THE INVENTION

Hydrogen cooler assemblies constructed in accordance with this invention comprise a cooler frame; a plurality of cooling tubes positioned within the cooler frame; an inlet end tubesheet for supporting the cooling tubes near a first end of the cooling tubes; an inlet chamber adjacent to the inlet end tubesheet; a reverse end tubesheet for supporting the cooling tubes near a second end of the cooling tubes; a reverse chamber adjacent to the reverse end tubesheet; a support bracket adapted to be mounted on a frame of an electric generator; the support bracket defining an opening sized to receive inlet and outlet connections extending from the inlet chamber; and the support bracket including a shoulder for supporting the inlet chamber.

These hydrogen coolers are particularly adapted to be preassembled, tested and subsequently dropped vertically (for vertical mounting) or slid horizontally (for horizontal mounting) through openings in the frame of an electric generator. When the coolers are used in a vertical configuration, the support bracket is mounted to the bottom of the electric generator and supports the remainder of the cooler assembly. When the coolers are used in a horizontal configuration, the support bracket is mounted on one end of the electric generator.

By providing a hydrogen cooler assembly that can be preassembled and tested prior to its installation in an electric generator, the invention reduces the possibility of leakage of hydrogen gas and coolant water that existed in prior art designs that had to be partially disassembled during installation in the generator.

This invention also encompasses a method of replacing hydrogen coolers comprising the steps of: (1) preassembling a hydrogen cooler including a cooler frame, a plurality of cooling tubes positioned within the cooler frame, an inlet end tubesheet for supporting the cooling tubes near a first end of the cooling tubes, an inlet chamber adjacent to the inlet end tubesheet, a reverse end tubesheet for supporting the cooling tubes near a second end of the cooling tubes, and a reverse chamber adjacent to the reverse end tubesheet; (2) mounting a support bracket adjacent to one end of an opening in a frame of the electric generator, the support bracket defining an opening sized to receive inlet and outlet connections extending from the inlet chamber, and the support bracket including a shoulder for supporting the inlet chamber; and (3) sliding the hydrogen cooler through the opening in the frame of the electric generator until the inlet and outlet connections extending from the inlet chamber pass through the opening in the support bracket, and the inlet chamber is positioned adjacent to the shoulder of the support bracket.

This invention improves the reliability of the coolers, reduces the complexity of manufacturing procedures, provides for increased personnel safety during installation, and is applicable to both new and repair service situations.

BRIEF DESCRIPTION OF THE DRAWINGS

FIG. 2 is a side elevation view of a prior art hydrogen cooler assembly;

FIG. 3 shows the inlet end of a prior art hydrogen cooler assembly;

FIG. 4 shows a cross-sectional view of the tube bundle of the prior art hydrogen cooler assembly of FIG. 2, taken along line 4—4;

FIG. 5 shows a detail of the reverse end assembly used in prior art hydrogen coolers;

FIG. 6 is a partially exploded side elevation view of a hydrogen cooler assembly constructed in accordance with this invention;

FIG. 7 is another partially exploded side elevation view of a hydrogen cooler assembly constructed in accordance with this invention;

DESCRIPTION OF THE PREFERRED EMBODIMENTS

Figure 1:
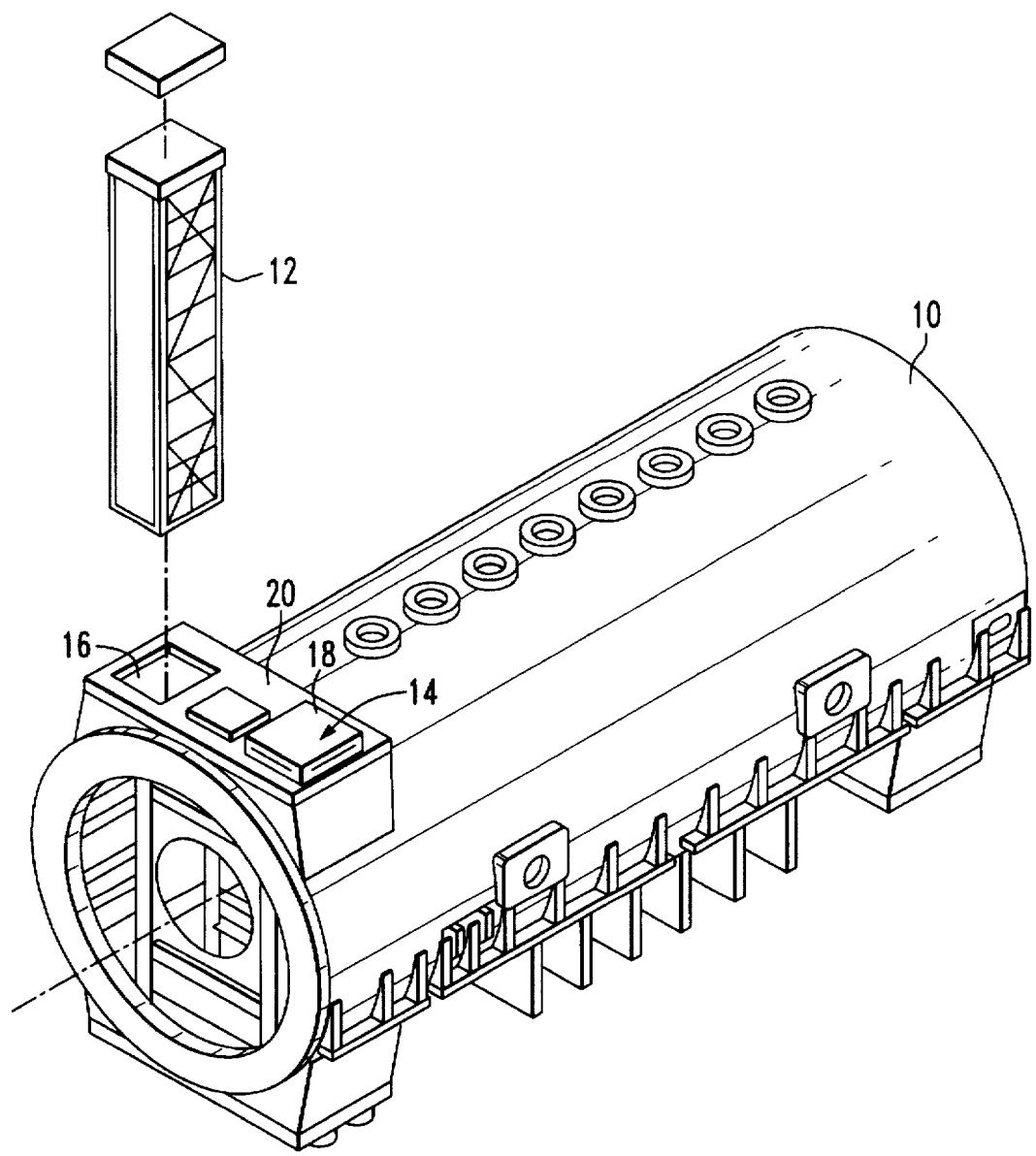
FIG. 1 is an isometric view of an electric generator showing the use of hydrogen cooler assemblies constructed in accordance with this invention.

Referring to the drawings, FIG. 1 is an isometric drawing of an electric generator 10 which includes hydrogen coolers 12 and 14 constructed in accordance with this invention. The coolers are inserted into one end of openings 16 and 18 in the generator frame 20. A bracket, not shown in this view, is positioned at the other end of each opening to support each cooler once it is positioned in the generator frame.

In order to understand the differences between the present invention and existing cooler designs, it is instructive to describe a prior art hydrogen cooler as shown in FIGS. 2–5. The coolers include a rectangular box frame 22, having a top 24 and a bottom 26. Cross bracing, not shown, is typically provided on the top and bottom faces, solid panels 27 form the sides of the rectangular frame. The frame encompasses a plurality of finned tubes 28 arranged on a triangular pattern when viewed from either end. Only a few of the tubes are shown in FIG. 2. On each end of the cooler frame, the tubes are fixed into tubesheets 30 and 32. The box frame, tubes and tubesheets taken together as an assembly are referred to as the tube bundle 34. For generator designs where the coolers are mounted vertically, the tube bundle is first completely lowered into the generator frame using an overhead crane. The tube bundle is carefully positioned so that the bottom end tubesheet 30 is flush with the generator frame cooler mounting flange, not shown, located at the bottom of the generator. At that point, an inlet chamber 38 on one end 40 of the tube bundle, the inlet end, is fixed to the tubesheet 30 by bolting and also fixed to the generator frame mounting flange by separate bolting. On the other end 42, the tubesheet 32 is not fixed directly to the frame, but instead is held in proper position and alignment by mechanical, leak tight, joints provided by expanding the tubes into the tubesheet holes. This is known as the "reverse" end, and also is referred to as a "floating tubesheet". Tubes are also expanded to form a mechanical leak-tight joint on the inlet end, and all such tube expansion, floating and fixed tubesheets, and frame being standard approaches in heat exchanger design practice for tube bundles.

On the inlet end 40, a cast or machined plate, known as the inlet chamber 38, is mechanically joined to the inlet tubesheet by threaded bolting. The inlet chamber has appropriate passages and partitions to properly direct flow into the tube bundle and a bolting pattern that aligns with the inlet tubesheet bolting pattern. A gasket 44 trapped between the inlet chamber and the inlet tubesheet provides the necessary seal against gas or cooling water leakage.

The inlet chamber 38 also has an outer bolting pattern 46 that matches the bolt hole pattern drilled in the generator frame inlet end. As a result of the inlet chamber bolting to both the cooler tube bundle inlet tubesheet 30 and the generator frame inlet end, the inlet chamber cross-section as viewed perpendicular to the tube bundle longitudinal axis, is larger than the tube bundle and the generator opening.

An inlet end cover 48 is assembled to the outside surface of the inlet end chamber. The inlet end cover 48 contains the inlet 58 and outlet 60 nozzles that serve as means for connecting the cooling water source, not shown. In the most common practice, this inlet end cover is not one single cover, but two separate covers 54 and 56, each fitted with a cooling water inlet connection 58 and a cooling water outlet connection 60. By the use of appropriate internal partitions, the two inlet covers together with the inlet chamber, divide the tube bundle into two equal sized, smaller coolers, often referred to as "sections" 62 and 64. Thus, in its most common arrangement, one hydrogen cooler functions as two equal sized smaller coolers, having separate, or split, inlet covers, each cover provided with one inlet and one outlet cooling water nozzle. Such two-coolers-in-one-frame are sometimes referred to as "duplex coolers". The inlet end covers 56 and 38 have bolt holes arranged on the same pattern as the inlet chamber, and use the same studs. Gasket 66 between the inlet end covers and inlet end chamber provide sealing means between these two members.

At the opposite end 42 of the cooler, known as the reverse end, because at this end, the cooling water is forced to reverse directions, the floating tubesheet 32 is mated with a reverse end chamber 68 and a reverse end cover 70. The reverse end chamber is a thick metal plate, or casting, that has appropriate bolt hole patterns, openings and partitions, that provide the means for receiving cooling water after its passage through the tubes of the tube bundle that are connected by internal fluid passages to the inlet nozzles and directing this flow of cooling water to those tubes connected by fluid passages to the outlet nozzles on the inlet end covers. The reverse end chamber and cover maintain the integrity of the two cooling sections. Gaskets 72, 74, 84, and 84A between the reverse end chamber and the reverse end tubesheet, and between the reverse end covers and the chamber provide sealing means when the reverse end covers and chambers are assembled by studs 76 and nuts 78, and half nuts (known also as jam nuts) 78A to the reverse end tubesheet.

It is important to note that the reverse end chamber and covers, unlike the inlet end chamber, do not have any dimensions that are larger than the cooler reverse end tubesheet or the cooler frame as viewed in cross-section along the longitudinal axis 80 of the cooler.

The overall length of the cooler tube bundle from inlet tubesheet to reverse end tubesheet is designed to match the distance between mounting flanges, located on the top and bottom of the generator frame, for vertical mounted coolers, or on the generator frame ends, for horizontal mounted coolers. A metal diaphragm 82 and gaskets 84 and 84A are positioned between the reverse chamber and the reverse tubesheet. The diaphragm is used to permit servicing of the tube bundle without complete degassing the generator. That is, the hydrogen pressure could be reduced and the reverse cover could then be removed. The diaphragm would prevent hydrogen leakage during cleaning of the tubes, being clamped between gasketing 84 and 84A which is in turn loaded in compression by half nuts 78A tightened against reverse end chamber 68.

FIGS. 6 and 7 show a side elevation views of a hydrogen cooler 100 constructed in accordance with this invention. The cooler includes a frame 102 enclosing a plurality of cooling tubes 104 (only a few of which are shown). The rectangular frame has essentially identical top and bottom faces 108, both having cross bracing 110 of typical construction. An inlet end tubesheet 112 is position near one end 114 of the cooling tubes, and a reverse floating tubesheet 116 is positioned near a second end 118 of the cooling tubes. A reverse chamber 120 is positioned adjacent to the reverse tubesheet 116. A gasket 122 is positioned between the reverse tubesheet and the reverse chamber.

An inlet chamber 126 is positioned adjacent to the inlet end tubesheet 112, with a gasket 124 between the inlet chamber and the inlet end tubesheet. The inlet chamber also includes a flange 128 and a pair of chamber portions 130 and 132 which direct coolant from an inlet 134 to the cooling tubes and pass coolant to an outlet 136 from the cooling tubes. Separate inlets 134 and outlets 136 are provided for each of the chamber portions 130 and 132. A support bracket 138 includes an opening 140 through which a portion of the inlet chamber can pass. A shoulder 142 is provided to support the hydrogen cooler when the inlet chamber flange 128 is positioned adjacent to the shoulder. A gasket 144 provides a seal between the shoulder and the flange. The bracket is also adapted to be bolted to the generator frame, such that surfaces 146 are positioned adjacent to the frame. A gasket 148 provides a seal between the generator frame and surfaces 146.

Figure 8:
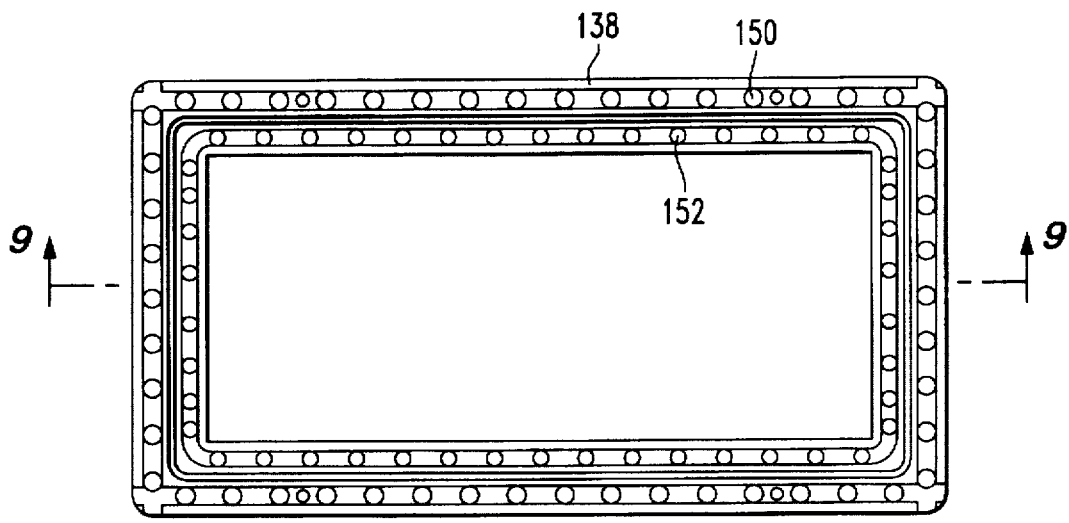
FIG. 8 shows the support bracket of a hydrogen cooler assembly constructed in accordance with this invention.

FIG. 8 is an end view of support bracket 138. Outside bolting pattern 150 is used to secure the bracket to the frame of an electric generator. Inside bolt pattern 152 secures the inlet chamber to the support bracket and also to the inlet tubesheet.

Figure 9:
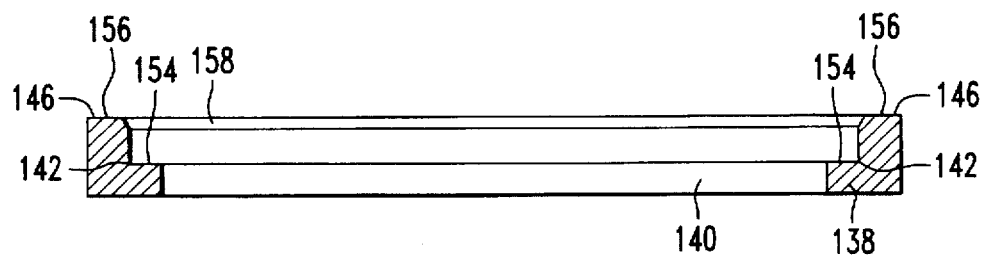
FIG. 9 is a cross-sectional view of the support bracket of FIG. 8, taken along line 9—9.

FIG. 9 is a cross-section of the support bracket of FIG. 8 taken along line 9—9. This figure shows a shallow groove 154 in shoulder 142. The groove serves to prevent slippage of the gasket which is positioned between the shoulder and the flange of the inlet chamber. Another shallow groove 156 is cut into surface 146 to prevent slippage of the gasket between the support bracket and the generator frame. A bevel 158 is cut in the support bracket to aid in the assembly of the cooler into the generator. If the assembled hydrogen cooler is slightly mis-aligned when it is lowered or slid into the open in the generator frame, the bevel guides it into the center of the support bracket, thus centering the cooler bolting patterns in the correct position.

Figure 10:
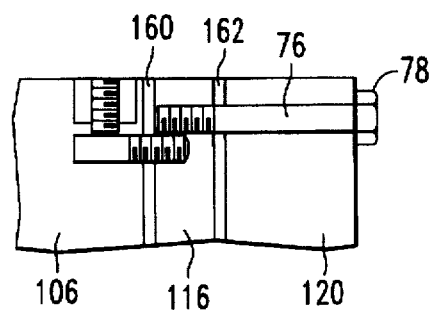
FIG. 10 shows a portion of the reverse end assembly of a hydrogen cooler assembly constructed in accordance with this invention.

FIG. 10 shows a portion of the reverse region of the hydrogen cooler. The reverse chamber 120 performs the functions of both the reverse chamber and reverse cover of prior art coolers. Only two gaskets 160 and 162 are required to prevent leakage between coolant and hydrogen.

When a hydrogen cooler is to be replaced, the support flange is assembled to the bottom of the generator where the inlet chamber was previously bolted. The cooler assembly is lowered into the generator and allowed to rest on the support flange. The cooler assembly is then bolted to the support flange. The diaphragm of the prior art assembly is eliminated from the coolers of the present invention. The ease of assembly and disassembly of this style of coolers makes assembly in place unnecessary. The time and effort required to remove the cooler for replacement or maintenance operations has been shown to be less than that required to perform any maintenance in place with prior art designs.

From the above discussion, it should be apparent that prior art cooler assemblies utilized multiple chamber components and numerous gaskets which provide potential leak paths. Moreover, for vertical coolers, any maintenance or replacement operation is further complicated by the fact that the inlet chambers and covers are located under the generator, which is typically a confined area. The chamber components are bulky and difficult to handle. Since there are no provisions for lifting the chambers into position, gaskets, chambers and covers have to be manually lifted into position and bolted to the bottom of the generator. This process is time consuming, tedious and can be dangerous. Manufacture of the prior art design requires stringent tolerances on the overall length and perpendicularity of the cooler bundle. This increases manufacturing cost.

The present invention allows the chambers to be bolted to the cooler bundle outside of the generator and the complete cooler assembly lowered into the generator.

Coolers constructed in accordance with this invention have chambers which can be bolted to the cooler bundle outside of the generator and the complete cooler assembly can be lowered into the generator. The window support flange is assembled to the bottom of the generator. With this invention, manufacture of the cooler bundle is simplified, overall length and perpendicularity is less critical. Manufacture of the chambers is also simplified. The use of an integral inlet and reverse chambers and covers eliminates four gaskets from the assembly. The cooler can be assembled and tested prior to installation into the generator. The chambers can be fitted with lifting holes, which allow the cooler to be lifted with standard lifting eyes. This eliminates the need for custom lifting fixtures. The newly designed chambers require no modification of the existing cooler bundle or generator. New chambers are fully compatible with the bolting pattern on existing generators, thereby simplifying retrofit procedures.

Coolers constructed in accordance with this invention can be completely assembled and tested prior to insertion into the generator frame. The chamber/cooler combination can be inserted into the generator as a complete subassembly.

This invention also encompasses a method of replacing hydrogen coolers in an electric generator, said method comprising the steps of: (1) preassembling a hydrogen cooler including a cooler frame; a plurality of cooling tubes positioned within the cooler frame; an inlet end tubesheet for supporting the cooling tubes near a first end of the cooling tubes; an inlet chamber adjacent to the inlet end tubesheet; a reverse end tubesheet for supporting the cooling tubes near a second end of the cooling tubes; and a reverse chamber adjacent to the reverse end tubesheet; (2) mounting a support bracket adjacent to one end of an opening in a frame of the electric generator, the support bracket defining an opening sized to receive inlet and outlet connections extending from the inlet chamber; and the support bracket including a shoulder for supporting the inlet chamber; and (3) sliding the hydrogen cooler through the opening in the frame of the electric generator until the inlet and outlet connections extending from the inlet chamber pass through the opening in the support bracket, and the inlet chamber is positioned adjacent to the shoulder of the support bracket. In the preferred embodiment of this invention, the inlet chamber includes a body portion and a flange. The body portion passes through the opening in the support bracket and the flange is coupled to the shoulder of the support bracket.

While specific embodiments of the invention have been described in detail, it will be appreciated by those skilled in the art that various modifications and alternatives to those details could be developed in light of the overall teachings of the invention. Accordingly, the particular arrangements disclosed are meant to be illustrative only and not limiting as to the scope of the invention which is to be given the full breadth of the appended claims and any and all equivalents thereof.

What is claimed:

1. A hydrogen cooler assembly comprising:
   a cooler frame;
   a plurality of cooling tubes positioned within the cooler frame;
   an inlet end tubesheet for supporting the cooling tubes near a first end of the cooling tubes;
   an inlet chamber adjacent to the inlet end tubesheet, the inlet chamber having inlet and outlet connections;
   a reverse end tubesheet for supporting the cooling tubes near a second end of the cooling tubes;
   a reverse chamber adjacent to the reverse end tubesheet;
   a support bracket adapted to be mounted on a frame of an electric generator;
   the support bracket defining an opening sized to receive the inlet and outlet connections; and
   the support bracket including a shoulder for supporting the inlet chamber.

2. A hydrogen cooler assembly as recited in claim 1, wherein the inlet chamber includes a body portion and a flange; and the flange is supported by the support bracket.

3. A hydrogen cooler assembly as recited in claim 2, further comprising:
   a first gasket positioned between the shoulder and the flange, the shoulder having a first groove for receiving at least a portion of the first gasket.

4. A hydrogen cooler assembly as recited in claim 3, further comprising:
   a second gasket for sealing between the support bracket and the frame of an electric generator, the support bracket having a second groove for receiving at least a portion of the second gasket.

5. A hydrogen cooler assembly as recited in claim 1, wherein the support bracket includes a beveled portion adjacent to the opening.

6. A hydrogen cooler assembly as recited in claim 1, wherein the cooler frame, the inlet end tubesheet and the inlet end chamber are all sized to pass through an opening in an electric generator.

7. A hydrogen cooler assembly as recited in claim 1, wherein the support bracket supports the cooler frame vertically within an electric generator.

8. A hydrogen cooler assembly as recited in claim 1, wherein the cooler frame is positioned parallel to a longitudinal axis of an electric generator.

9. A hydrogen cooler assembly as recited in claim 1, further comprising a reverse end gasket positioned between the reverse chamber and the reverse end tubesheet.

10. A hydrogen cooler assembly as recited in claim 1, wherein the support bracket includes a plurality of mounting holes, the mounting holes being positioned to receive studs extending from an electric generator frame.

11. A method of replacing hydrogen coolers in an electric generator, said method comprising the steps of:
   preassembling a hydrogen cooler including a cooler frame; a plurality of cooling tubes positioned within the cooler frame; an inlet end tubesheet for supporting the cooling tubes near a first end of the cooling tubes; an inlet chamber adjacent to the inlet end tubesheet, the inlet chamber having inlet and outlet connections; a reverse end tubesheet for supporting the cooling tubes near a second end of the cooling tubes; and a reverse chamber adjacent to the reverse end tubesheet;
   mounting a support bracket adjacent to one end of an opening in a frame of the electric generator, the support bracket defining an opening sized to receive the inlet and outlet connections; and the support bracket including a shoulder for supporting a portion of the inlet chamber; and
   sliding the hydrogen cooler through the opening in the frame of the electric generator until inlet and outlet connections pass through the opening in the support bracket, and a portion of the inlet chamber is positioned adjacent to the shoulder of the support bracket.

* * * * *